Jan. 2, 1934. W. SCHROEDER 1,941,582
HOIST ATTACHMENT FOR TRUCKS
Filed Nov. 16, 1932
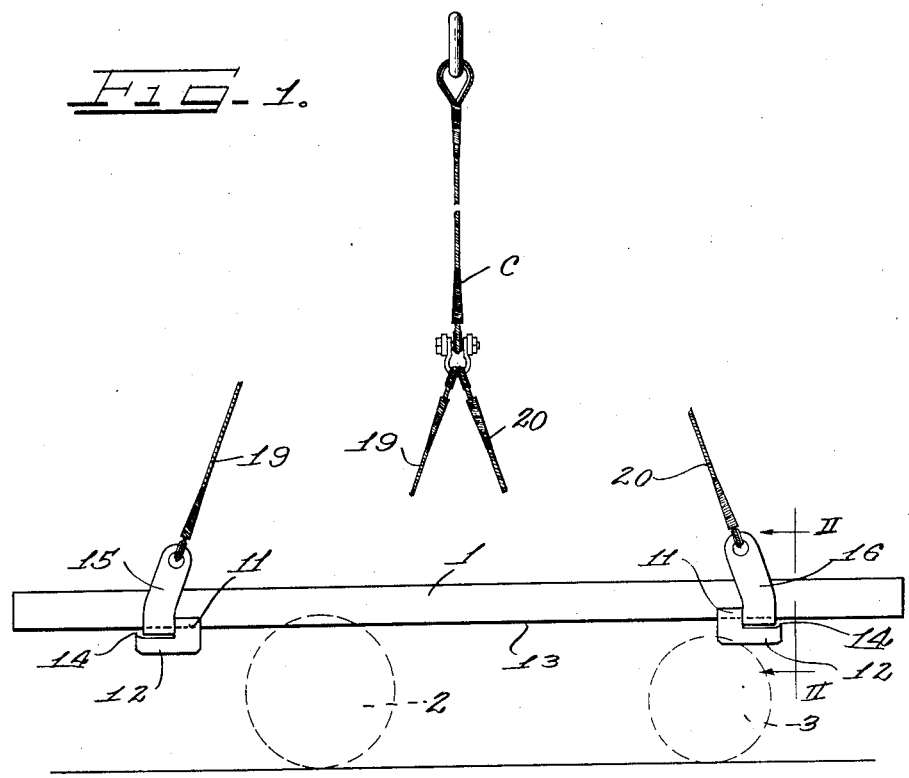
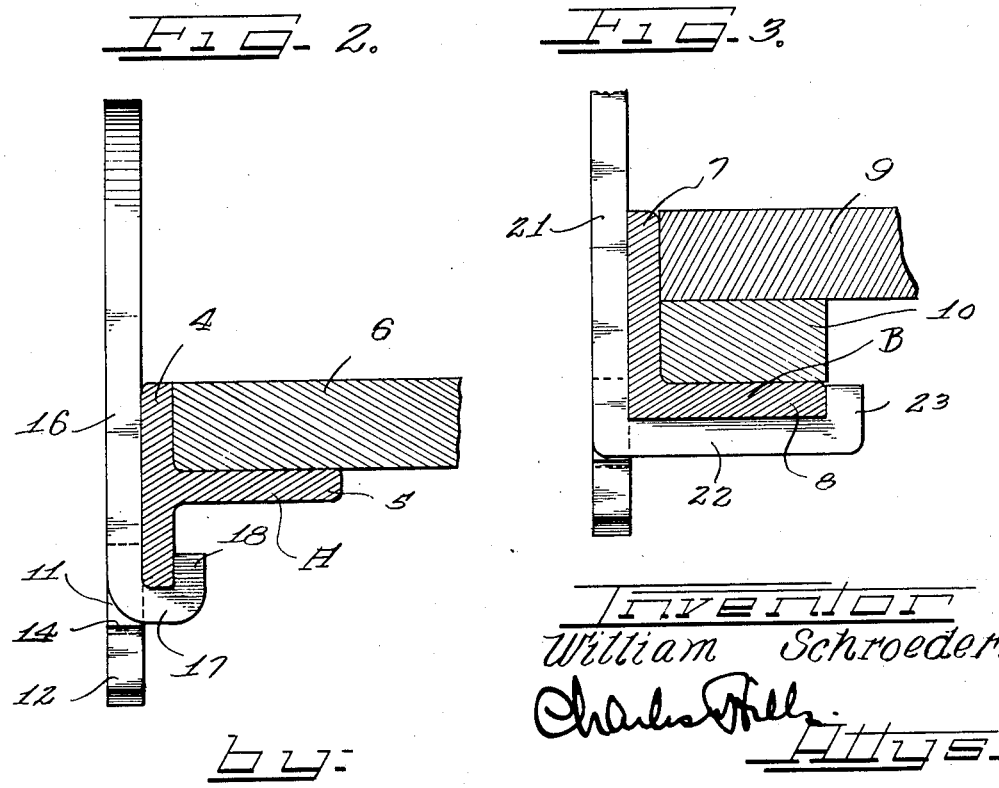
Inventor
William Schroeder.

Patented Jan. 2, 1934

1,941,582

UNITED STATES PATENT OFFICE 1,941,582

HOIST ATTACHMENT FOR TRUCKS

William Schroeder, Chicago, Ill., assignor to Mercury Manufacturing Company, Chicago, Ill., a corporation of Illinois Application November 16, 1932
Serial No. 642,902

8 Claims. (Cl. 294—67)

The present invention relates to hoist attachments for trucks and more particularly to means for retaining sling hooks in engagement with truck bodies for preventing accidental displacement of the hooks from the truck bodies.

An object of the present invention is to provide a hoist attachment for trucks whereby sling hooks may be retained in hooking engagement with a truck body, when the sling is slack, to prevent accidental unhooking.

Another object of the invention is to provide retaining means secured to a truck body frame for cooperating with sling hooks to prevent accidental disconnection of the hooks from the truck.

A further object of the invention is to provide retaining means secured to a truck frame with portions spaced from the truck frame for receiving between the means and the adjacent edges of the truck frame, the sling hooks used in raising and lowering the truck in service.

A still further object of the invention is to provide retaining means secured to a truck frame for preventing accidental displacement of sling hooks from the truck body, thus preventing accidental tipping of the truck body during hoisting or lowering.

The above, other, and further objects of the invention will be apparent from the following description, accompanying drawing, and appended claims.

The accompanying drawing illustrates an embodiment of the present invention and the views thereof are as follows:

Figure 1 is a diagrammatic view showing, in side elevation, a truck body, sling hooks engaging the body frame, and means embodying the principles of the present invention for preventing accidental dislodgment of the hooks from the body.

Figure 2 is an enlarged vertical sectional view taken substantially in the plane of line II—II of Figure 1.

Figure 3 is a view similar to Figure 2 showing the application of the present invention to a truck frame which is composed of angle members.

The drawing will now be explained.

A truck body 1 is suitably supported on wheels 2 and 3.

The present invention finds ready applicability to trucks used in loading carriers such as freight cars, ships and the like where merchandise is placed on the trucks and transported to the carriers and then the truck with its load is bodily loaded into the carrier. In some instances the load may be delivered at its destination while still on the truck and in other instances the truck with its load is moved to a place of storage such for instance as in a ship's hold where the load is then properly stowed in the hold. The present invention is useful in connection with L. C. L. shipments of freight by train where trucks suitably loaded may be bodily loaded into freight cars and then unloaded at the points of destination.

The illustrated embodiment of the present invention contemplates a truck having a frame consisting of T-bars A as in Figure 2 or angle members B as in Figure 3.

A frame constructed of T-members such as A in Figure 2 is formed with the vertical boundary portions of the truck body defined by the head 4 of the T, and with the web 5 horizontally disposed to support the floor 6. When the frame is constructed of angles such as shown at B in Figure 3 one leg 7 of the angle defines a vertical boundary of the body and another leg 8 extends inwardly to support the floor 9. In the arrangement illustrated in Figure 3 a filler block 10 is interposed between the inwardly extending leg 8 of the angle and the floor 9.

Attached to each of the side members of the frame are clips or lugs, which are substantially L-shaped in elevation, and which have the legs 11 preferably welded to the vertical boundary portion of the frame. The clips have horizontally extending portions 12 disposed substantially parallel to the lower edges 13 of the vertical boundary of the frame. The clips are arranged, on one side of the frame, with the portions 12 extending in opposite directions, away from each other. The extremities of the portions 12 are provided with upturned ends 14 to serve as means for preventing displacement of a sling hook 15 when the sling, designated generally at C, is slackened.

The sling hooks 15 and 16, of which preferably there are four, are made with the lower ends inturned and then upturned thus forming a seat portion 17 and a flange 18. The distance between the flange 18 and the adjacent surface of the hook 16 is substantially that of the thickness of the web 4 of the T-bar A. The clips are applied to the truck frame body so that the distance between the top margin of the upturned parts 14 and the adjacent edge 13 of the truck frame is but slightly greater than the thickness of the seat member 17 of a sling hook. The hooks 15 and 16 have the upper portions thereof bent so as to extend towards each other, when a pair of these is applied against one side of a truck body, as is illustrated in Figure 1. The hooks 15 and 16, of which there are usually four, are connected to cables 19 and 20 forming a part of the sling structure.

The frame 1 of the truck body is thus provided with bottom edge portions engageable by the lifting hooks and the clips serve as means to prevent disengagement of the hooks from these bottom edge portions of the frame, by gravitational movement when the sling is slackened.

The design and positioning of the clips necessitate bodily movement of the hooks along the truck body in the direction of the length thereof for effecting hooking engagement with the truck body and for disengaging the hooks from hooking engagement with the body. The provision of the protuberances or detents 14 on the lengthwise extending portions 12 of the clips prevents dislodgement of the hooks 15 and 16, lengthwise of the truck body, when the sling is slackened. The minimum distance between the detents 14 and the adjacent bottom edges of the vertical portions of the frame structure is such as to be but slightly more than the thickness of the portions 17 of the hooks, to thus assure against displacement of the hooks when the sling is slackened.

It will be observed that the hooks 15 and 16 are applied in hooking engagement by movement along the frame in the direction of the length thereof into engagement with the clips and that unhooking engagement is accomplished by movement of the hooks in the opposite directions.

The clips further serve as means to limit the approach of the hooks towards each other, on one side of the truck, when the sling is tightened for lifting or hoisting purposes.

Figure 3 illustrates the application of the principles of the present invention to a truck frame body where the frame member is constructed of angles.

In this form of the invention a hook is designated generally at 21 which also represents the vertical portion of the hook, an underlying or supporting portion 22 and an inwardly upturned portion or flange 23, the latter adapted to engage against the inner edge of the horizontal leg 8 of the angle.

The provision of the clips and the arrangement and positioning of the same, aids in directing the engagement of the flanges 18 and 23 against the inner surfaces of the web 14 of the T-member and the horizontal leg 8 of the angle member, as the distance between the bottom edges of the frame and the upper surfaces of the portions 12 of the clips is but slightly greater than the thickness of the underlying portions 17 and 22 of the hooks thus preventing too great canting of the hooks when the sling is operated in the direction to lift the truck from the floor or ground.

It will be observed that the hooks must be applied to and removed from hooking engagement with the truck body by movements along the length of the frame and that the clips prevent accidental unhooking by gravitational movement when the sling is slackened.

It may be observed that the hoist attachment for trucks of the present invention is simple, expedient, and highly efficient for the intended use. The clips may be manufactured at relatively low cost, and readily applied to truck bodies as desired.

The gist of the present invention resides in the provision of means for cooperating with hooks engageable with truck bodies, to prevent accidental unhooking of the hooks with respect to the truck body by gravitational movement, when the hoist mechanism or sling is slackened.

The invention is claimed as follows:

1. The combination with a truck including a frame having a vertical boundary portion extending below the floor of the truck, of lift hook retaining means secured to the truck frame and having portions spaced from and extending along the lower edges of the frame, and lift hook means adapted to be releasably engaged around the lower edges of the frame between said edges and said retaining means.

2. The combination with a truck including a frame having vertical portions in its boundaries for engagement by lifting hooks, of lifting hook retaining means disposed adjacent such portions, said retaining means having parts spaced from and extending along the lower edges of said vertical portions, and lift hook means adapted to be releasably engaged about the lower edges of the vertical portions between said edges and the spaced parts of said hook retaining means.

3. Lift hook retaining means for trucks including L-shaped clips attachable to a truck body, said clips having horizontal parts disposed along the truck body in direction of its length and cooperating with the body to provide hook engaging recesses, said clips having detent means on said horizontal parts for preventing accidental displacement of said hooks from said recesses when the lift means become slack.

4. An article of manufacture consisting of a clip for application to a truck body to cooperate with the truck body for retaining lifting hooks in engagement with the truck body, said clip comprising an L-shaped member having a part for attachment to the truck body and another part adapted to lie along the truck body when the clip is applied, said last named part having a detent near its free end.

5. The combination with a truck including a frame having a vertical boundary portion extending below the floor of the truck, of lift hook retaining means secured to the truck frame and having portions spaced from and extending along the lower edges of the frame, and lift hook means adapted to be releasably engaged around the lower edges of the frame between said edges and said retaining means, said retaining means preventing disengagement of the hook means from hooking engagement with the truck frame except by movement of the hook means along the truck frame in the direction of its length.

6. The combination with a truck including a truck frame having bottom edge portions in its boundaries for engagement by lifting hooks, clips attached adjacent said edge portions and having parts positioned below and in spaced relation to said bottom edge portions to prevent hooking and unhooking engagement with said edge portions by vertical movement of the hooks, said clips necessitating bodily sidewise movement of the hooks along the truck body to cause engagement and disengagement of said hooks with said edge portions, said clips serving also to limit movement of said hooks towards each other in directions along the truck body.

7. Lift hook retainers for application to a truck body, said retainers being substantially L-shaped in elevation and applied with the vertical legs thereof attached to the truck structure and with the horizontal legs extending in the direction of the portion of the structure to which said retainers are applied, said retainers being applied with the horizontal legs extending away from each other, the horizontal legs of said retainers cooperating with the adjacent part of the truck structure to provide hook receiving recesses, said horizontal legs having upstanding detents near the free ends thereof for preventing accidental displacement of hooks from said recesses when the lift means is slackened.

8. The combination with a truck including a frame having a vertical boundary portion extending below the floor of the truck, of lift hook retaining means secured to the truck frame and having portions spaced from and extending along the lower edges of the frame, and lift hook means adapted to be releasably engaged around the lower edges of the frame between said edges and said retaining means, said retaining means having parts positioned to prevent gravitational disengagement of said hooks from the truck frame when the lift means is slackened.

WILLIAM SCHROEDER.